United States Patent Office 2,931,716
Patented Apr. 5, 1960

2,931,716

METHOD FOR HANDLING LIQUID MATERIALS AND FOR GRANULATING AND CONDITIONING SOLIDS

Joseph A. Kelley, Greenville, and John L. Ridgeway, Travelers Rest, S.C., assignors to Zonolite Company, Chicago, Ill., a corporation of Montana No Drawing. Application November 16, 1954
Serial No. 469,298

3 Claims. (Cl. 71—1)

This invention relates to an improved method of converting liquids, powders and the like into a product having a dry appearing, granular, freely-flowing form, from which the liquids may be removed if desired, and to the resulting products. The technique of this invention now makes possible not only easier handling of liquids or powders which may ordinarily be difficult to handle for one reason or another, but also makes possible the production of novel products comprising an inorganic foraminous material having its interstices filled with solid materials.

We have found not only that vermiculite and similar inorganic foraminous materials can be used to convert difficult-to-handle liquids into dry appearing, granular, freely-flowing products, but also that the liquid can be removed from the foraminous material to produce novel and useful products which are substantially dustless, non-caking, relatively non-hygroscopic, and resist leaching.

Our invention thus provides not only a new technique for handling liquid materials but also provides a new method of granulating and conditioning solids.

In the production of granulated solids, our invention involves absorbing a liquid (which may contain solid material dissolved therein) on an inorganic formainous product such as expanded vermiculite, and then drying the resulting product. This results in a particle having its interstices filled with solid material which may be crystalline in form. Where the liquid is in the form of a solution of a solid material, the drying of the vermiculite-solution mixture results in a building up or granulation characterized by filling in the vermiculite "skeleton" with the crystals of the desired solid. Of course, the selection of the particle size of the vermiculite will control the particle size of the end product.

While this method is applicable to any solid material which is soluble in a liquid, it is likewise applicable to the treatment of viscous liquid chemicals to produce such products as, for example, "granulated" chlordane and toxaphene. A novel form of fertilizer materials such as granulated ammonium nitrate and other plant nutrient materials in vermiculite can likewise be produced in accordance with our technique.

Accordingly, one object of this invention is to provide a new, improved means for handling liquids, powders, and the like.

Another object is to provide means for converting liquids and powders into the form of a novel dry appearing, granular, free-flowing product, from which the liquid may be removed if desired.

Another object is to provide a new means of improving the form of nutritionally available metabolic compounds.

By way of specific illustration of a particular embodiment of our invention, the application of the techniques of our invention will be described in connection with the production of certain novel plant nutrient products, although it is to be clearly understood that this is an illustrative embodiment only and is not to be construed in a limiting sense.

The purposeful use of certain metal compounds in plant nutrition is now an accepted and established procedure due to the rewarding and often remarkable results achieved in increasing the health and yield of plant life by making various "trace elements" or "trace metals" nutritionally available to plants, trees, shrubs and the like.

One of the difficulties associated with satisfying plant requirements of such trace metals is the fact that the form of the metals plays an important part of determining their availability to the plant. Thus insoluble metal compounds are generally less able to satisfy a plant's physiological requirements than are soluble materials. Soluble materials, on the other hand, possess the disadvantage of being readily leached out of the soil when applied to the plant root area; and furthermore, the degree of solubility of a metal compound is not always a true indicia of its nutritional availability.

One of the metals which has been shown to have considerable importance as a plant nutrient is iron, a deficiency of this metal resulting in the condition known as "iron chlorosis" and being of particular importance in connection with citrus fruit trees. Among the materials which have been widely used in the treatment of iron chlorosis is a commercial product known as "Versene Iron Chelate" produced by the Bersworth Chemical Company. This material is, chemically, the disodium mono iron salt of ethylene diamine tetra acetic acid and is produced by reacting a solution of the tetra sodium salt of the acid with $FeSO_4.6H_2O$ (copperas) to produce a solution of the sodium-iron salt. The solution is then sprayed into a heated chamber to drive off the water and the solid compound is then recovered.

In treating or preventing the occurrence of iron chlorosis the resulting material is applied to the area above and around the roots of the plant, tree, shrub and the like, in the manner in which fertilizers are applied.

While the disodium mono iron salt of ethylene diamine tetra acetic acid does have a tremendous utility in the treatment of iron chlorosis, the commercially available form is subject to a number of objectionable deficiencies. Thus, the spray dried product is too finely divided and is an extremely dusty powder; furthermore, the material is hygroscopic and upon exposure to air soon becomes gummy and lumpy. It has also been found that in field use the dust from this material is deposited on the leaves of the trees, shrubs, or plants being treated and burns the leaves. A further difficulty is that the material is so highly soluble in water that it leaches readily from the soil after application and its effectiveness is thus diluted, dissipated and substantially lowered.

We have discovered that metal complexes of ethylene diamine tetra acetic acid in solution form, as for example, the disodium mono iron salt of this acid, can be absorbed on exfoliated vermiculite and the vermiculite-solution mixture dried to produce a vermiculite particle having its interstices filled with crystal of solid metal chelate. The product in this form is dustless, non-caking, relatively non-hygroscopic, and resistant to the effect of leaching. These effects are accomplished by building up the particle size of the chemical compounds from that represented by an impalpable powder to granules which may range in size from, for example, 8 mesh down to 80 mesh or more. Since this building up or granulation is a filling in of the vermiculite skeleton with the desired solid, it is obvious that the selection of particle size of the vermiculite will control the particle size of the end product, and that accordingly an extremely wide range of particle sizes is possible.

The following examples will serve to document a num-

Example 1

5770 parts by weight of a commercial preparation consisting of an aqueous solution containing 50% by weight of the tetra sodium salt of ethylene diamine tetra acetic acid, 375 parts by weight of $H_2SO_4$ (93.2%) and 1652 parts by weight of $FeSO_4.6H_2O$ were mixed and heated sufficiently to dissolve the solids. The solution was then poured over 1821 parts of exfoliated vermiculite in a tumble mixer, then transferred to a rotary drier heated to 300° F. until the moisture content was 1.0%, and the dried product collected. The freshly treated vermiculite may have some lumps which can be screened and crushed before transferring the product to the rotary drier and a one half inch mesh screen is useful for this purpose. The damp mixture screens very easily and the few lumps formed during the wetting are easily friable.

Example 2

5244.9 parts of a commercial preparation consisting of an aqueous solution containing 55% by weight of the tetra sodium salt of ethylene diamine tetra acetic acid, 375 parts by weight of $H_2SO_4$ (93.2%), and 1652 parts by weight of $FeSO_4.6H_2O$ were mixed and heated and the solution poured over exfoliated vermiculite in a tumble mixer. The amount of vermiculite used was 1704 parts and the ratio of the weight of the water in the aqueous solution of chelating agent to the weight of vermiculite was 1.38. The material was easily workable through the screens and drier, and a short curing period of one to two hours gave a crisp loose material. The curing involves letting the hot damp material cool slightly so that the crystals of $Na_2FeEDTA$ may begin forming, and the sodium sulphate in the mix can begin taking up water of crystallization. These two reactions appear to effect removal of enough of the free water in the batch to give a crisp feel to the mix.

Example 3

Another example of a procedure for preparing the composition of the present invention is as follows:

5244.9 parts by weight of "Versene liquid," a commercial preparation consisting of an aqueous solution containing 55% by weight of the tetra sodium salt of ethylene diamine tetra acetic acid, 375 parts by weight of $H_2SO_4$ (93.2%) and 1652 parts by weight of $FeSO_4.6H_2O$ was mixed in a steam heated kettle with an agitator. The temperature of the solution was raised to about 190 to 212° F., the solution then pumped to a tumble mixer and mixed with 1704 parts of No. 4 vermiculite.

The hot damp mix was then dumped into curing tubs and allowed to set for one or two hours. The cured mix was then passed through a ½ inch mesh screen into a hopper and from the hopper to a rotary drier where it was fed into the hot end, the material flowing parallel with the heat. The maximum temperature in the drier was 500–550° F. and the temperature of the discharge end was between about 200 and 250° F., and the material traveled through the drier in about 7 to 8 minutes. The dried hot material was passed over a conventional cooling chute and then over an 8 mesh screen to remove lumps. A small quantity of furnace oil was sprayed on the material to eliminate any trace of dustiness.

The sulfuric acid used in the above examples has a number of functions here. It reduces the pH of the mixture from, for example, an extremely alkaline 11 down to a pH of 8 for example, thus making the final product more neutral and less likely to deleteriously affect the pH of the soil to which the finished material is applied. Additionally, the tetra sodium salt of ethylene diamine tetra acetic acid reacts with the sulfuric acid to form $Na_2SO_4$; the latter salt, in forming, takes up its water of crystallization and thus helps remove free water from the resulting product.

The amount of sulfuric acid used can be varied within a wide range to give any desired pH to the final material.

It will be obvious to those skilled in the art that there are numerous ways in which to mix the material, for example, the chemical may be dissolved in the solution and the solution applied to the vermiculite; the dry chemicals could be mixed with the vermiculite and the solvent then added; or part of the solids could be dissolved and applied to a dry mixture of the solid and vermiculite. The preferred procedure is to dissolve all soluble solids and then apply the solution to the vermiculite. I have found that for best results it is preferable that the ratio of weight of water (in the solution) to the weight of vermiculite should be not over about 1.5, since otherwise the resulting mix is generally too wet for easy handling.

The present method while specifically described hereinbefore for the production of a novel plant nutrient material, is applicable to any chemical which is soluble in a liquid. For example, common fertilizer materials can be granulated in this manner. Viscous liquid chemicals may be handled similarly, granulated chlordane and toxaphene in vermiculite being examples of the latter. Furthermore, any porous carrier may be used such as vermiculite, perlite, pumice, slag, and granular clays.

There is of course, no minimum limit to the quantity of solids which can be granulated by this method; the maximum limit of the process is naturally dependent upon the nature of the solid to be granulated, such as its solubility in water or other solvents and the absorption capacity of the carrier for the solvent. Furthermore, the material can be dried several times between applications of the liquid to thus build up higher concentrations.

It is likewise within the scope of the present invention to add a small amount of water proofing materials such as urea formaldehyde resins, preferably formed "in situ" in the mix whereby to reduce the leaching property of the chelates. Other water proofing agents which can be used are hydrocarbon oils, paraffin waxes and the like.

Since certain changes in carrying out the above process, and certain modifications in the article which embodies the invention may be made without departing from its scope, it is intended that all matter contained in the above description shall be interpreted as illustrative and not in a limiting sense. It is also to be understood that the following claims are intended to cover all of the generic and specfic features of the invention herein described which, as a matter of language, might be said to fall therebetween.

We claim:

1. The method which comprises reacting an aqueous solution of the tetra sodium salt of ethylene diamine tetra acetic acid with an iron sulfate in the presence of sulfuric acid, mixing the resulting material with exfoliated vermiculite, permitting the resulting material to cure whereby sodium sulfate formed during the said reaction removes free water from the mix, and heating the resulting granular material at a temperature and for a time sufficient to remove substantially all of the free water.

2. The method of claim 1 wherein the ratio of water in the said solution to the weight of the exfoliated vermiculite is not over about 1.5.

3. The method of claim 1 wherein the iron sulfate is copperas.

(References on following page)

References Cited in the file of this patent

UNITED STATES PATENTS

| | | | |
|---|---|---|---|
| Re. 21,638 | Treeland | Nov. 26, | 1940 |
| 847,749 | Ellis | Mar. 19, | 1907 |
| 2,192,939 | Slayter et al. | Mar. 12, | 1940 |
| 2,240,859 | Rice | May 6, | 1941 |
| 2,341,800 | Martin et al. | Feb. 15, | 1944 |
| 2,669,510 | Dresser | Feb. 16, | 1954 |
| 2,791,496 | Rice | May 7, | 1957 |

OTHER REFERENCES

Agricultural Chemicals, Atognini, Iron Chelates Control Iron Chlorosis, November 1954, pages 47–49 and 131.

Plant Physiology, Jacobson, Maintenance of Iron Supply in Nutrient Solutions, Addition of Ferric Potassium EDTA, April 1951, pages 411–413.

Agricultural Chem., Alexander et al., Control of Iron Chlorosis, July 1952, pages 36–38.

Science, Stewart et al., Chelates as Source of Iron for Plants, November 21, 1952, pages 564–66.

Citrus Magazine, Stewart et al., Iron Chlorosis, Its Possible Causes and Control, June 1952, pages 22–25.